US010689054B2

(12) United States Patent
Keutz et al.

(10) Patent No.: US 10,689,054 B2
(45) Date of Patent: Jun. 23, 2020

(54) SHELL-TYPE FRAME UNIT, METHOD FOR PRODUCING A FRAME UNIT, AND USE OF A FRAME UNIT

(71) Applicants: THYSSENKRUPP STEEL EUROPE AG, Duisburg (DE); thyssenkrupp AG, Essen (DE)

(72) Inventors: Andreas Keutz, Düsseldorf (DE); Jia-Uei Chan, Mülheim an der Ruhr (DE); Melanie Borucki, Düsseldorf (DE); Daniel Nierhoff, Mülheim an der Ruhr (DE); Matthias Schirmer, Düsseldorf (DE); Oliver Rott, Düsseldorf (DE)

(73) Assignee: thyssenkrupp AG, Essen (DE)

( * ) Notice: Subject to any disclaimer, the term of this patent is extended or adjusted under 35 U.S.C. 154(b) by 151 days.

(21) Appl. No.: 15/752,772

(22) PCT Filed: Jul. 21, 2016

(86) PCT No.: PCT/EP2016/067382
§ 371 (c)(1),
(2) Date: Feb. 14, 2018

(87) PCT Pub. No.: WO2017/029065
PCT Pub. Date: Feb. 23, 2017

(65) Prior Publication Data
US 2018/0237098 A1    Aug. 23, 2018

(30) Foreign Application Priority Data

Aug. 20, 2015    (DE) .................. 10 2015 113 863

(51) Int. Cl.
*B62K 19/20*    (2006.01)
*B62K 19/08*    (2006.01)
*B21D 53/86*    (2006.01)

(52) U.S. Cl.
CPC .............. *B62K 19/08* (2013.01); *B62K 19/20* (2013.01); *B21D 53/86* (2013.01)

(58) Field of Classification Search
CPC ......... B62K 19/08; B62K 19/20; B21D 53/86
(Continued)

(56) References Cited

U.S. PATENT DOCUMENTS 2,537,325 A    1/1951    Bowden
3,347,112 A *  10/1967   Thun ..................... B62M 3/003
                                                      74/594.2
(Continued)

FOREIGN PATENT DOCUMENTS

CN    104369824 A    2/2015
DE    29819267 U    3/1999
(Continued)

OTHER PUBLICATIONS

Chinese Search Report for CN Application No. 2016800470589 dated Jun. 17, 2019.
(Continued)

*Primary Examiner* — Jacob D Knutson
(74) *Attorney, Agent, or Firm* — RMCK Law Group PLC

(57) ABSTRACT

A frame unit for a two-wheeled vehicle may comprise a main frame. The main frame may be formed by a first partial shell and a second partial shell that is joined to the first partial shell. The first partial shell and the second partial shell may be produced from a material comprising steel. The main frame may further comprise an upper tube, a lower tube, a seat tube, and/or a head tube. A rear section may be joined to the main frame and may include a chain stay and/or a seat stay. Further, each of the first and second partial shells may form a lateral half of the main frame, and the first and second partial shells may have a C-shaped cross section. The
(Continued)

frame unit avoids the disadvantages of the prior art and offers a high degree of design freedom.

12 Claims, 9 Drawing Sheets

(58) Field of Classification Search
USPC .................................................. 280/288.3
See application file for complete search history.

(56) References Cited

U.S. PATENT DOCUMENTS

| | | | | |
|---|---|---|---|---|
| 4,351,569 | A * | 9/1982 | Steuer | B60B 27/023 |
| | | | | 301/110.5 |
| 5,011,172 | A * | 4/1991 | Bellanca | B62K 19/02 |
| | | | | 264/258 |
| 5,913,529 | A * | 6/1999 | Patterson | B62K 3/10 |
| | | | | 280/226.1 |
| 2001/0028158 | A1 * | 10/2001 | Devitt | B62K 17/00 |
| | | | | 280/283 |
| 2009/0212530 | A1 | 8/2009 | Sasnowski | |
| 2014/0120364 | A1 * | 5/2014 | Peca | B23K 26/22 |
| | | | | 219/121.63 |
| 2014/0286718 | A1 * | 9/2014 | Scherman | B23B 27/143 |
| | | | | 407/114 |
| 2015/0048592 | A1 * | 2/2015 | Choi | B21D 53/86 |
| | | | | 280/288.3 |

FOREIGN PATENT DOCUMENTS

| | | |
|---|---|---|
| DE | 29823882 U | 1/2000 |
| DE | 20311742 U1 | 11/2003 |
| DE | 102012004174 A | 9/2013 |
| EP | 0511421 A1 | 11/1992 |
| FR | 475337 A | 5/1915 |
| FR | 544920 A | 10/1922 |
| FR | 612718 A | 10/1926 |
| GB | 20999 A | 12/1897 |
| JP | S58205631 A | 11/1983 |
| WO | 2013029788 A | 3/2013 |

OTHER PUBLICATIONS

English Translation of International Search Report issued in PCT/EP2016/067382, dated Oct. 13, 2016 (dated Oct. 21, 2016).
European Office Action for EP Application No. 16 745 080.8 dated Mar. 11, 2019, 7 pages.
2nd European Office Action for EP Application No. 16 745 080.8 dated Sep. 9, 2019.

* cited by examiner

US 10,689,054 B2

SHELL-TYPE FRAME UNIT, METHOD FOR PRODUCING A FRAME UNIT, AND USE OF A FRAME UNIT

CROSS REFERENCE TO RELATED APPLICATIONS

This application is a U.S. National Stage Entry of International Patent Application Serial Number PCT/EP2016/067382, filed Jul. 21, 2016, which claims priority to German Patent Application No. DE 10 2015 113 863.8, filed Aug. 20, 2015, the entire contents of both of which are incorporated herein by reference.

FIELD

The present disclosure generally relates to frames for a two-wheel vehicles, including frames for bicycles.

BACKGROUND

Various bicycle frames are known from the prior art for two-wheeled vehicles, such as bicycles. Two-wheeled vehicle frames can be fabricated, for example, by means of the conventional tubular construction made of steel. In this process, various round tubes are joined together at their ends in order to form, for example, part of a two-wheeled vehicle frame, such as the main frame. By main frame is meant, in the context of the two-wheeled vehicle frame, especially the central frame piece with no further add-on features, such as a rear section. However, design freedom is restricted in this construction in the design of the two-wheeled vehicle frame. Accordingly, the material steel has been almost entirely supplanted in the manufacture of such frame units by other materials, such as aluminum or carbon fiber-reinforced materials.

Thus, for example, WO 2013/029788 A1 discloses a two-wheeled vehicle frame formed by half-shells which are made of a fiber-reinforced thermoplastic material.

US 2015/0048592 A1 also specifies that materials such as aluminum, carbon fibers, or titanium are used rather than steel. But with new materials, defects such as cracks may occur when welding the frame together. The use of a left and a right frame body is proposed. Furthermore, it is proposed to employ reinforcing sheets.

US 2009/0212530 A1 likewise specifies that the conventionally used steel tubes are a disadvantage and that materials such as aluminum, magnesium, titanium and fiber-reinforced plastics are more advantageous. It is disclosed that the frame of a bicycle is made from a left and a right half-shell.

The use of carbon fibers or aluminum, however, results in relatively poor recycling properties of the frame. Furthermore, the use of reinforcing sheets results in more costly fabrication methods.

DE 10 2012 004 174 A1 describes frame components of a two-wheeled vehicle system. A single frame component can be produced from a first and a second half-shell made of molded sheet metal parts. In order to form the main frame, however, further frame components are needed, which accordingly makes the fabrication costly.

Thus a need exists for frame units and methods of manufacturing frame units that offer a high degree of design freedom and avoid the drawbacks of the prior art.

BRIEF DESCRIPTION OF THE FIGURES

FIG. 7a is a perspective view of another example frame unit having an example main frame.

FIG. 7b is a slightly different perspective view of the example frame unit shown in FIG. 7a.

DETAILED DESCRIPTION

Figure 1:
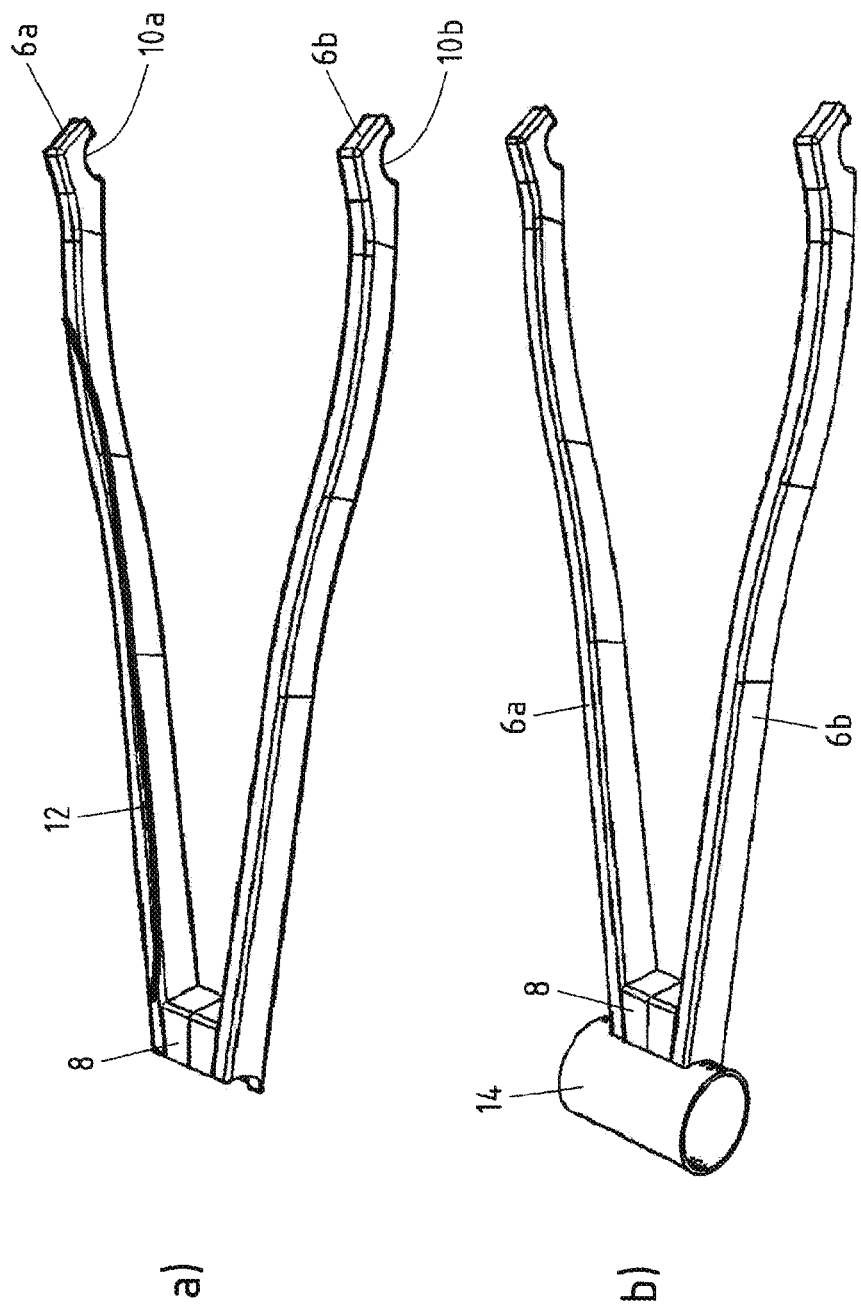
FIG. 1a is a perspective view of part of a rear section of an example frame unit.
FIG. 1b is a perspective view of the rear section of the example frame unit, but with an example bottom bracket housing arranged on chain stays and a folded piece of the example frame unit.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to frame units for two-wheeled vehicles. In some examples, such a frame unit may comprise a main frame. Likewise, the present disclosure generally relates to methods for producing frame units that comprise a main frame for a two-wheeled vehicle.

According to the present disclosure, the problem discussed in the background can be solved with a frame unit of the conventional kind in that the main frame is formed by a first partial shell and a second partial shell joined to the first partial shell and in that the first partial shell and the second partial shell are produced from a material comprising steel.

Thus, the invention willfully departs from the approaches followed in the prior art, which propose the use of light metals and carbon fiber-reinforced plastics. Instead, it has been recognized that, owing to a main frame made from at least two partial shells joined together and made from a material comprising steel, on the one hand the design freedom can be heightened despite the use of steel, as compared to conventional frames made of steel, and on the other hand a good stability can be achieved at the same time. Finally, a relatively simple manufacture can also be made possible. Contrary to preconceptions, it has been shown that comparatively rigid and light frame units can be produced as compared to aluminum, for example, even without internal reinforcing sheets, and furthermore these units nevertheless have a distinctly more delicate and elegant appearance.

As already described at the outset, by the main frame is meant in particular the central frame piece without further add-on parts such as a rear structure. Thus, in contrast with the prior art, while the entire main frame can be formed by the first and the second partial shell in particular, it is preferable not to form the entire frame or frame unit, but instead only the main frame of the frame unit, from the first and the second partial shell. For example, a rear section and/or other add-on parts of the frame unit are not formed by the first and the second partial shell. In this way, an advantageous modular construction is achieved.

For example, the main frame comprises several tubular sections (for example, two, three or four). The tubular sections may have for example a substantially straight or curved course. The main frame has, for example as seen from the side, a substantially triangular or trapezoidal geometry, especially when the frame unit is designed as a diamond frame. For example, at least one tubular section of the main frame may have a variable cross sectional shape along its length. In this way, a load-oriented and/or weight-optimized construction can be provided, which is not possible with conventional steel tubes.

Preferably, precisely two partial shells are provided, so that the first partial shell is in particular a first half-shell and the second partial shell is in particular a second half-shell. The partial shells are in particular lateral partial shells, each one forming a lateral half of the main frame. The first partial shell, viewed in the longitudinal direction or the direction of travel of the two-wheeled vehicle, is for example a right partial shell and the second partial shell is a left partial shell of the main frame.

For example, the partial shells each have at least for a portion a substantially C-shaped cross section. For example, the partial shells are designed substantially in a mirror-symmetrical manner, especially along the joint plane.

As a further advantage of the frame unit according to the invention, it has been found that owing to the use of partial shells the joining areas between the partial shells can be arranged in a load-oriented manner as compared to the conventional steel tube construction, which results in better stability.

According to a preferred embodiment of the frame unit according to the invention, the main frame comprises an upper tube, a lower tube, a seat tube and/or a head tube. It has been found that when the main frame comprises such parts, an especially stable and easily produced frame unit with appealing appearance can be provided.

For example, the frame unit is a so-called diamond frame or a portion thereof, which enables an especially good stability together with low weight. In this case, the main frame consists, for example, of the upper tube, the lower tube, the seat tube and the head tube. The main frame has a substantially triangular or trapezoidal geometry. A rear section which is provided may likewise have a substantially triangular or trapezoidal geometry.

According to another preferred embodiment of the frame unit according to the invention, the first partial shell and/or the second partial shell are produced by deep drawing. With deep drawn partial shells, complex geometries with good rigidity can be realized. In the end, this results in a high degree of design freedom with variable cross sections of the frame unit. Furthermore, a sufficiently good dimensional accuracy of the partial shells can be achieved. For example, the partial shells are made of sheet metal blanks.

According to another preferred embodiment of the frame unit according to the invention, the first partial shell and the second partial shell are joined together by means of a thermal welding method, especially by means of laser welding and/or by means of laser hybrid welding. By laser hybrid welding is meant in particular a laser welding method with supply of a protective gas, such as an inert protective gas (like argon and/or helium) or an active protective gas (like carbon dioxide and/or oxygen), similar to MIG or MAG welding. It has been found that, owing to the use of the thermal welding method and especially laser welding and/or laser hybrid welding, a far-reaching automation capacity of the production process can be achieved. Furthermore, it has been found that there is a low degree of thermal warpage after the welding, which results in good dimensional accuracy of the frame unit and an accordingly small amount of additional work. As a result, a more attractive appearance can be achieved as compared to traditional welding methods.

According to another preferred embodiment of the frame unit according to the invention, the first partial shell and the second partial shell are joined together at least for a portion substantially along the main loading direction. By the main loading direction is meant in particular the direction along which the frame unit experiences the greatest loading. For example, the partial shells are joined together at least for a portion substantially in parallel with the main loading direction. In other words, the joining sites or joining seams run along or parallel to the main loading direction. If the main frame comprises tubular sections, for example, the joining sites or joining seams run substantially in the longitudinal direction of the tubular sections.

According to another preferred embodiment of the frame unit according to the invention, at least one cable conduit, especially for a shifting cable and/or a brake cable, runs at least for a portion between the first partial shell and the second partial shell in the main frame. By providing partial shells, cable conduits can be integrated especially easily in the frame unit, since these can be introduced into the first partial shell for example before the joining of the first and the second partial shell.

According to another preferred embodiment of the frame unit according to the invention, the frame unit comprises a rear section connected to the main frame, which rear section comprises in particular at least one stay, especially at least one chain stay and/or at least one seat stay. The rear section or parts thereof, for example the chain stays, can basically also be formed by the first and the second partial shell, that is, be formed integrally with the main frame. However, it is preferable for the rear section to be formed separately from the partial shells and connected to them. In this way, in particular, an individual adapting of the frame unit can be facilitated. Likewise, in this way the rear section can be designed with closed profiles and the individual stays of the rear section need not be formed by half-open partial shells.

Preferably, the rear section comprises (at least) two lower stays or chain stays and/or (at least) two upper stays or seat stays. For example, the chain stays and/or seat stays are designed as profiles or folded pieces. Preferably, the chain stays are joined together by a folded piece to improve the stability.

According to another preferred embodiment of the frame unit according to the invention, the frame unit comprises one or more add-on parts, especially one or more bearing bushings, a head tube, a seatpost, a seat clamp and/or a bottom bracket housing. Alternatively, however, one or more of these add-on parts may also be formed integrally with the partial shells, that is, with the main frame. By the separate design as add-on parts, however, a good dimensional accuracy can be achieved in the regions of the corresponding add-on parts.

The bearing bushings (for example two) may serve for the precise holding of the headset. Alternatively, the entire head tube may also be designed as an add-on part. It may, for example, be enclosed at least partly by the partial shells. In this way, an extremely rigid head tube can be realized. The same holds for the formation of the seatpost. It may likewise be designed as an add-on part and be enclosed, for example, at least partly by the partial shells, making possible an especially rigid design of the seatpost. Finally, the seat clamp or the bottom bracket housing may also be designed as an add-on part. Here as well, correspondingly narrow tolerances can be set as a result. In particular, a rigid nodal design can be achieved in the region of the bottom bracket housing.

According to another preferred embodiment of the frame unit according to the invention, the material is steel, especially a high-strength steel, or a steel composite material. If the material is a steel or a high-strength steel, solid sheets can be used, for example. If the material is a steel composite material, a sandwich sheet can be used, for example, comprising metal cover layers and a plastic layer arranged in between. Owing to these composite materials, advantageous properties may be achieved, such as low weight together with relatively good rigidity, in particular. Advantageously, the material is formed into the corresponding partial shells by deep drawing.

According to another preferred embodiment of the frame unit according to the invention, a drive unit or a portion thereof and/or an energy accumulator or a tank for therefor is are arranged between the first partial shell and the second partial shell in the main frame. The drive unit is for example an electric drive unit or electric motor. The energy accumulator is for example a battery. It is likewise conceivable to provide a tank for a fuel. In this way, the frame unit according to the invention can be used advantageously for motor-driven two-wheeled vehicles.

According to a second teaching of the present invention, the problem mentioned at the outset is solved in a method of the conventional kind in that the method involves the following steps: providing of a first partial shell and a second partial shell, wherein the first partial shell and the second partial shell are produced from a steel material; and joining of the first partial shell and the second partial shell so that the main frame of the frame unit is formed.

The method according to the invention diverges from the prior art and the use of light metals and carbon fiber-reinforced plastics. Instead, two partial shells are provided that are joined together and made from a material comprising steel, in order to form the main frame of the frame unit. In this way, the design freedom can be enhanced despite the use of steel as compared to conventional frames made of steel and a good stability can be achieved. Owing to the use of partial shells to make the main frame, the manufacturing method is furthermore extremely simple and economical to carry out. As a result, it is possible to make comparatively rigid and light frame units, for example relative to aluminum, which units furthermore have a distinctly more delicate and elegant appearance.

According to a preferred embodiment of the method according to the invention, the providing of the first partial shell and the second partial shell involves a deep drawing of the first and/or second partial shell. Owing to the use of deep drawing, an especially high degree of design freedom can be achieved with adequate rigidity and dimensional accuracy. For example, it is possible for this purpose to place sheet metal blanks in corresponding dies, which produce the corresponding partial shells from the sheet metal blanks.

According to a preferred embodiment of the method according to the invention, the method furthermore involves: positioning of the first partial shell; arranging of one or more add-on parts, especially one or more bearing bushings, a head tube, a seatpost, a seat clamp and/or a bottom bracket housing, on the first partial shell.

Owing to the positioning of the first partial shell, for example by placing it in a fixture, corresponding add-on parts can then be arranged precisely in the intended positions. Basically, it is conceivable that the elements realized by the add-on parts are already integrated from the outset in the corresponding partial shells. However, by providing separate add-on parts, a further enhanced dimensional accuracy and rigidity can be achieved in the region of the add-on parts. According to further optional work steps, the second partial shell can be positioned on the first partial shell and the joining of the first partial shell and the second partial shell can take place so that the main frame of the frame unit is formed.

According to a preferred embodiment of the method according to the invention, the method furthermore involves: positioning of stays, especially chain stays, for a rear section of the frame unit; connecting of the stays by a connection element, especially a folded piece; optional adapting of the stays, especially by chip removal; and arranging of the stays on the first partial shell.

Owing to the additional steps of this preferred embodiment, one can first manufacture a subassembly, which is then arranged on the first partial shell. This simplifies the method of production of a frame unit with a main frame and rear section arranged on said main frame, but designed to be at least partly separate from it. By the connecting of the stays with a connection element, the stability of the subassembly and ultimately that of the rear section can be enhanced. Preferably, the stays and/or the connection element can also be connected to the bottom bracket housing before the subassembly of stays, folded piece and bottom bracket housing is arranged on the partial shell. Owing to the further step of adapting the stays, for example by milling, the dimensional precision is enhanced. For example, the stays may likewise be produced beforehand from partial shells or else from folded pieces.

According to a preferred embodiment of the method according to the invention, the method furthermore involves: integrating of at least one cable conduit in the frame unit for at least a portion. The cable conduits may be used, for example, for shift cables or brake cables. Owing to the providing of partial shells, cable conduits can be integrated especially easily in the frame unit, especially the main frame, because of the easy accessibility. For example, the cable conduits are positioned in the first partial shell before the joining of the first and the second partial shell.

Alternatively or additionally, it is conceivable to position further elements prior to the joining of the first and second partial shell for integration in the first partial shell. For example, an (electric) drive unit or a portion thereof and/or an energy accumulator or a tank therefor can be arranged between the first and the second partial shell.

According to a preferred embodiment of the method according to the invention, the joining of the first partial shell and the second partial shell involves a thermal welding method, especially a laser welding and/or a laser hybrid welding. Owing to the use of the thermal welding method and especially laser welding and/or laser hybrid welding, a far-reaching automation capacity of the production process, a low degree of thermal warpage, and an attractive appearance can be achieved.

Regarding further advantageous embodiments of the method, reference is made to the description of the frame unit and the advantages described there.

By means of the previous and the following description of preferred embodiments of the frame unit, corresponding methods steps for the production of corresponding frame units by preferred embodiments of the method are also intended to be disclosed. Likewise, corresponding frame units are also intended to be disclosed by the disclosure of preferred embodiments of the method for production of a frame unit.

According to a third teaching of the present invention, the problem mentioned at the outset is furthermore solved by the use of a frame unit according to the invention for a physically powered and/or motor-driven two-wheeled vehicle, especially for a bicycle, an electric bicycle, or a motorbike such as a motorcycle.

Figure 3:
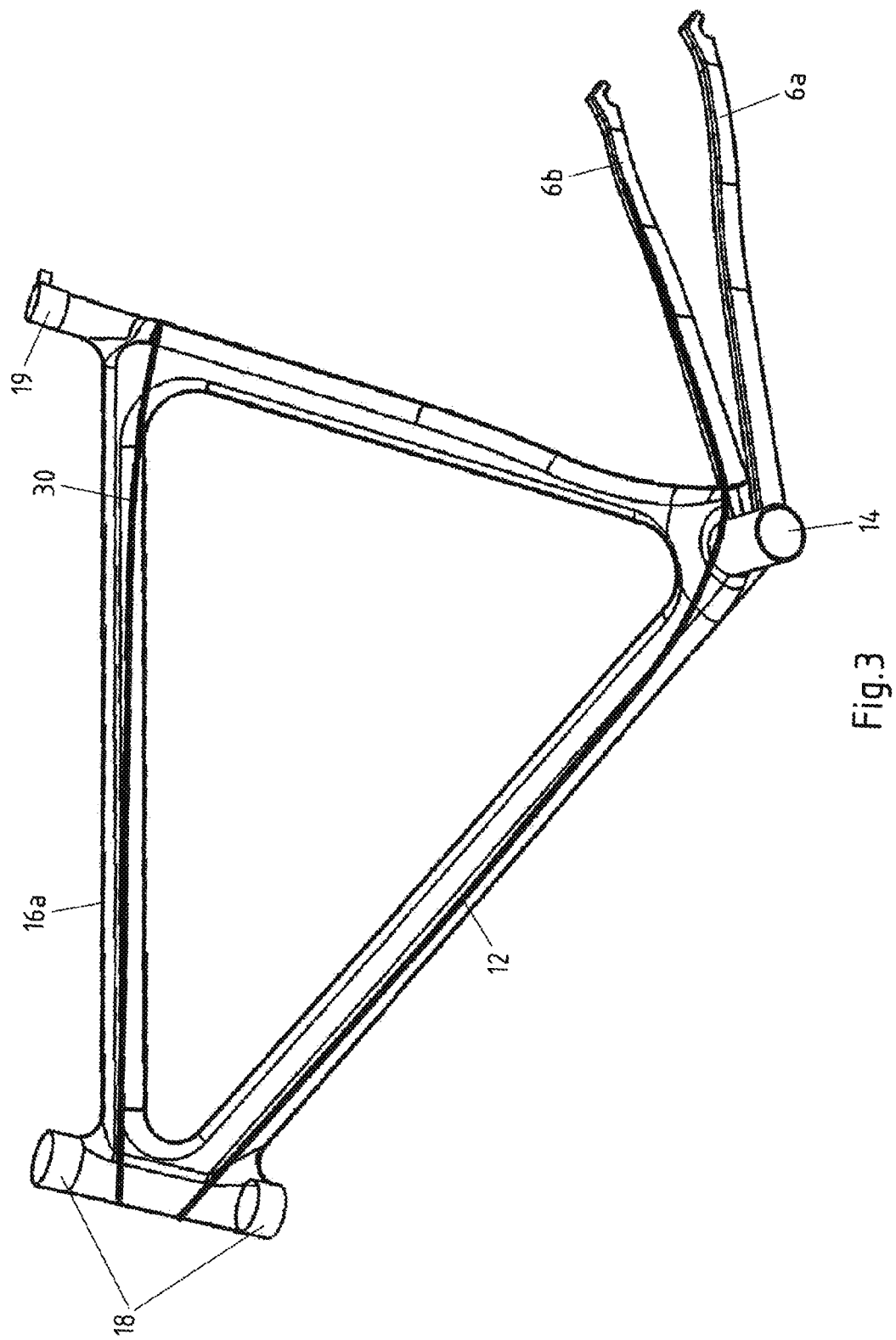
FIG. 3 is a perspective view of the first partial shell from FIG. 2, but with example cable conduits placed into the first partial shell.
Figure 4:
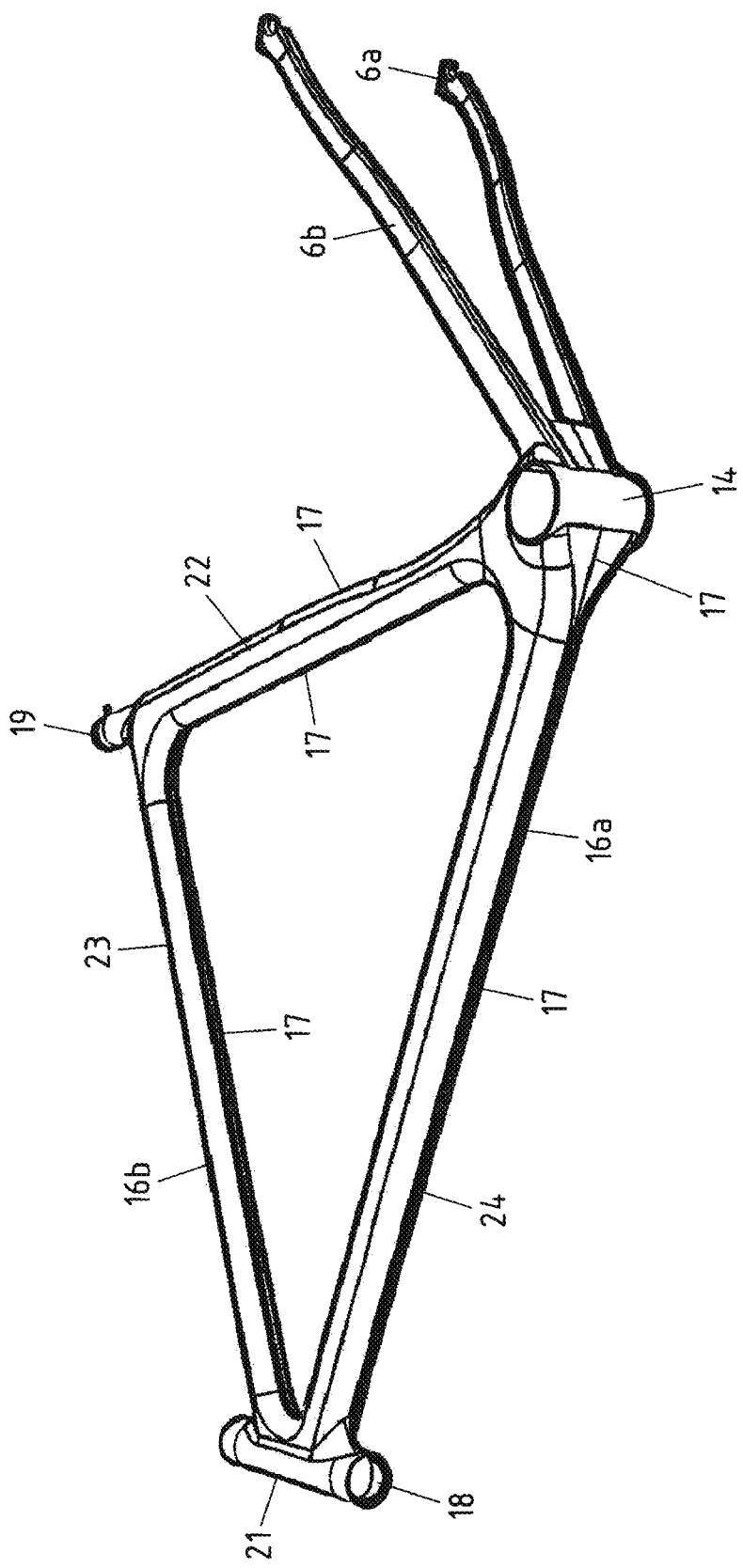
FIG. 4 is a perspective view of the arrangement from FIG. 3, wherein an example second partial shell has been positioned on and joined to the first partial shell.
Figure 5:
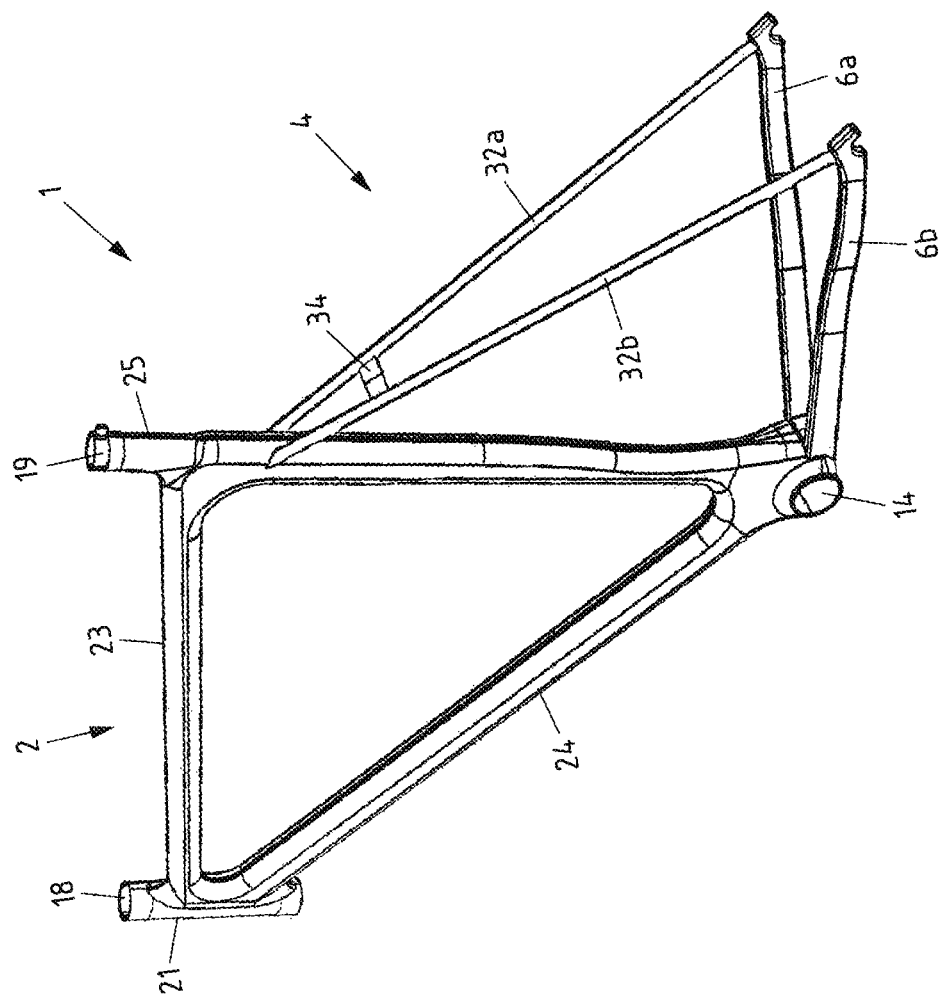
FIG. 5 is a perspective view of an example frame unit that includes the example main frame and the example rear section.

FIGS. 1 to 4 show, first of all, perspective views to illustrate an exemplary embodiment of a method for production of a first exemplary embodiment of a frame unit 1 according to the invention, as is represented in FIG. 5, at different moments in time. The frame unit 1 in this example is a bicycle frame and consists substantially of a main frame 2 and a rear section 4. The substantially triangular or trapezoidal main frame 2 comprises a head tube 21, a seat tube 22, an upper tube 23 and a lower tube 24 (see FIG. 5).

FIG. 1a now shows first of all a perspective view of part of the rear section 4 for the frame unit 1 of FIG. 5. First of all, two stays are positioned, in this case two chain stays 6a, 6b, and connected by a folded piece 8. The chain stays 6a, 6b are each formed as closed hollow profiles, for example being made from folded pieces or joined half-shells. The chain stays 6a, 6b each comprise a recess 10a, 10b to accommodate the rear axle. The tolerances for the installation of the rear axle can be adjusted precisely. Furthermore, there is already integrated into the chain stay 6a a cable conduit 12 for the shifting cable, which runs inside the chain stay 6a, yet is represented for illustrative purposes.

FIG. 1b shows the portion of the rear section 4 from FIG. 1a, wherein now a bottom bracket housing 14 has additionally been arranged on the chain stays 6a, 6b and the folded piece 8. Owing to the separate design of the bottom bracket housing 14, the tolerance for the bottom bracket can be adjusted precisely.

An adapting, such as a further milling, of the chain stays 6a, 6b, may now optionally be carried out, if required.

Figure 2:
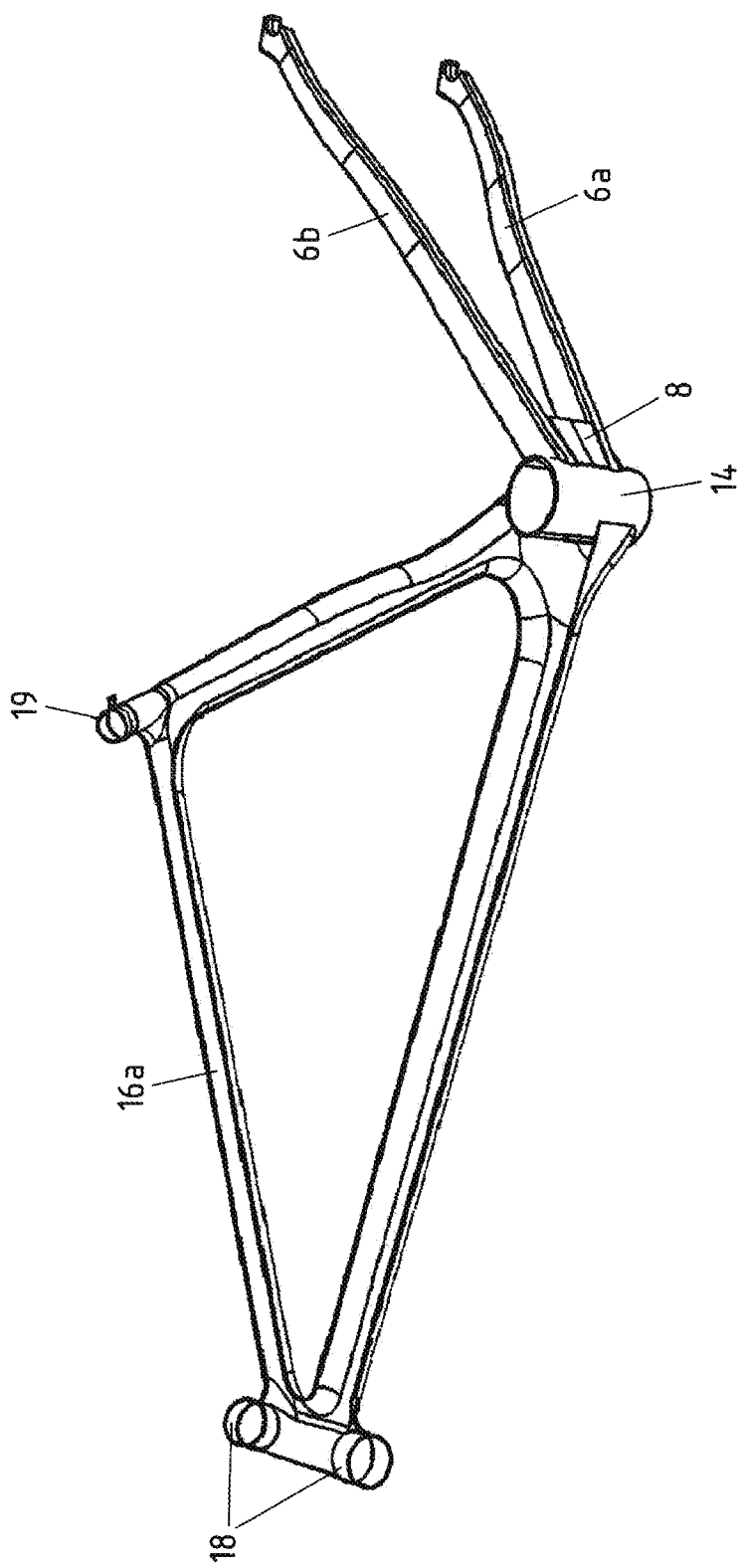
FIG. 2 is a perspective view of an example first partial shell of a main frame of the example frame unit.

FIG. 2 now shows a perspective view of a first partial shell 16a of the main frame 2 of the frame unit 1. The first partial shell 16a is designed in this case as a right half-shell and has a substantially C-shaped cross section. The first partial shell 16a has been made from steel plate by deep drawing. The first partial shell 16a has been placed in a fixture (not shown). This enables an exact positioning of add-on parts and the subassembly from FIG. 1.

As add-on parts, two bearing bushings 18 for the headset (not shown), a seat clamp 19 and the subassembly from FIG. 1 comprising the bottom bracket housing 14, the chain stays 6a, 6b and the folded piece 8 have been positioned and arranged on the partial shell 16a. Basically, however, individual elements can also be formed integrally with the partial shell 16a. Owing to the add-on parts 14, 18, 19, narrow tolerances can be set.

FIG. 3 shows a perspective view of the first partial shell 16a from FIG. 2, but now cable conduits 12, 30 have been placed additionally into the first partial shell 16a. The cable conduit 12 for the shifting cable runs substantially along the (as yet absent) lower tube 24 and the cable conduit 30 for the brake cable runs substantially along the (as yet absent) upper tube 23.

FIG. 4 now shows a perspective view of the arrangement from FIG. 3, wherein a second partial shell 16b has been positioned on the first partial shell 16a and joined to it. The second partial shell 16b is designed as a left half-shell and is substantially the mirror image of the first partial shell 16a. The first partial shell 16a and the second partial shell 16b for example have been joined together by means of laser welding or laser hybrid welding along the weld seams 17. In this way, a low degree of thermal warpage has occurred after the welding, resulting in a good dimensional accuracy of the frame unit and an accordingly small amount of additional work. As a result, a more attractive appearance can be achieved as compared to traditional welding methods.

The first partial shell 16a and the second partial shell 16b are joined together at least for a portion substantially along the main loading direction. As a result, the weld seams 17 are positioned in a load-oriented manner.

FIG. 5 now shows a perspective view of the first exemplary embodiment of the frame unit 1. As already discussed, the frame unit 1 is composed basically of a main frame 2 and a rear section 4. The main frame 2 has been formed by the joining of the first partial shell 16a and the second partial shell 16b. The main frame 2 is substantially triangular or trapezoidal and comprises a head tube 21, a seat tube 22, an upper tube 23 and a lower tube 24. The head tube 21 and the seatpost 25 are formed integrally with the main frame. The rear section 4 has been further supplemented with two additional stays, in this case seat stays 32a, 32b, each of which runs from the upper part of the seat tube 22 to the corresponding ends of the chain stays 6a, 6b. The seat stays are likewise joined together by a connection element 34. Owing to the seat stays 32a, 32b being designed to be separate from the main frame 2, they can be adapted individually. For example, different cross sections are possible for the seat stays 32a, 32b, such as round or oval cross sections. Oval cross sections favor an aerodynamic design.

Another preferred embodiment, not represented here, makes provision for first connecting together the seat stays, the chain stays and optionally the bottom bracket housing and then attaching them as a unit to the partial shells.

Figure 6:
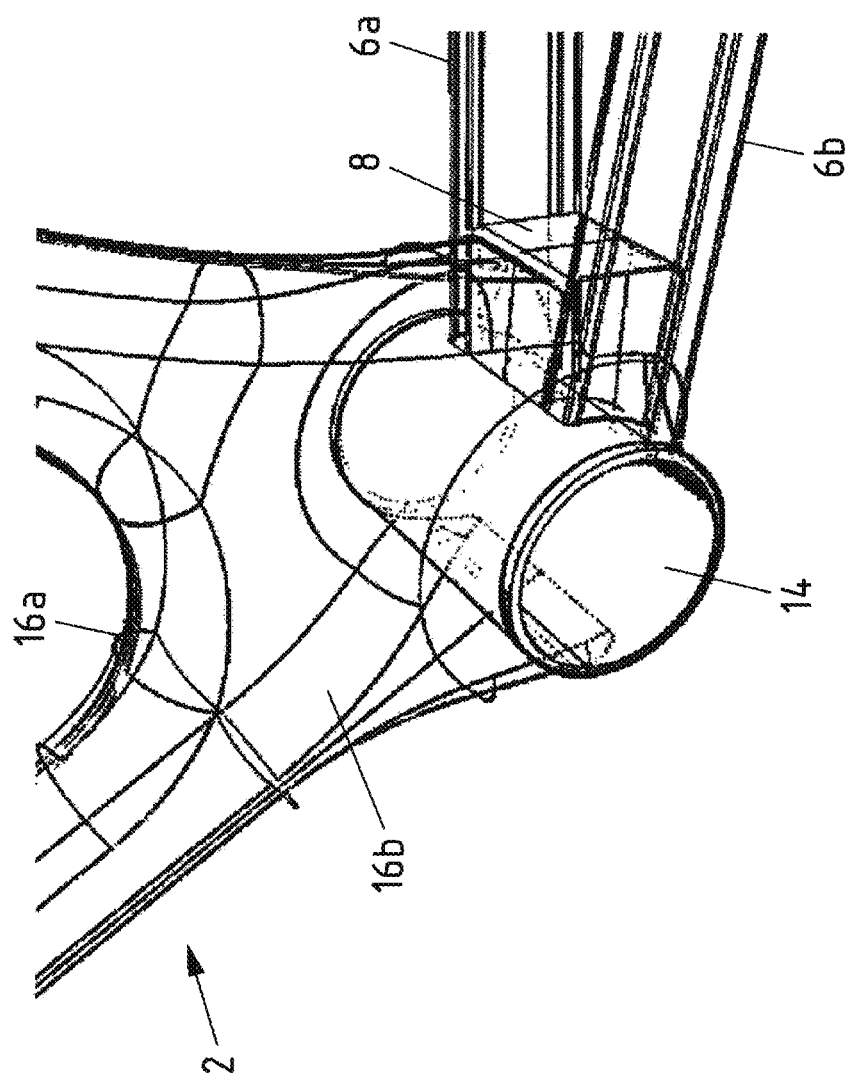
FIG. 6 is an enlarged, semi-transparent view of an example frame unit in an area of an example bottom bracket housing.

FIG. 6 shows an enlarged, see-through view of the frame unit 1 in the area of the bottom bracket housing 14. Owing to the separate construction of main frame 2, bottom bracket housing 14 and rear section 4 in the area of the bottom bracket, this node point can be designed to be especially rigid. This would only be possible in the case of a single-piece construction by means of reinforcing sheets. The encasing of the bottom bracket housing 14 by the half-shells 16a, 16b likewise favors the stability and optical appearance. Furthermore, the construction so as to be separate from the main frame 2 makes it possible to design the profiles of the chain stays 6a, 6b and the seat stays 32a, 32b as closed profiles.

FIG. 7a,b show two perspective views of a second exemplary embodiment of a frame unit 1' according to the invention, distinguished inter alia by a different main frame 2' than that of the frame unit 1.

Figure 7:
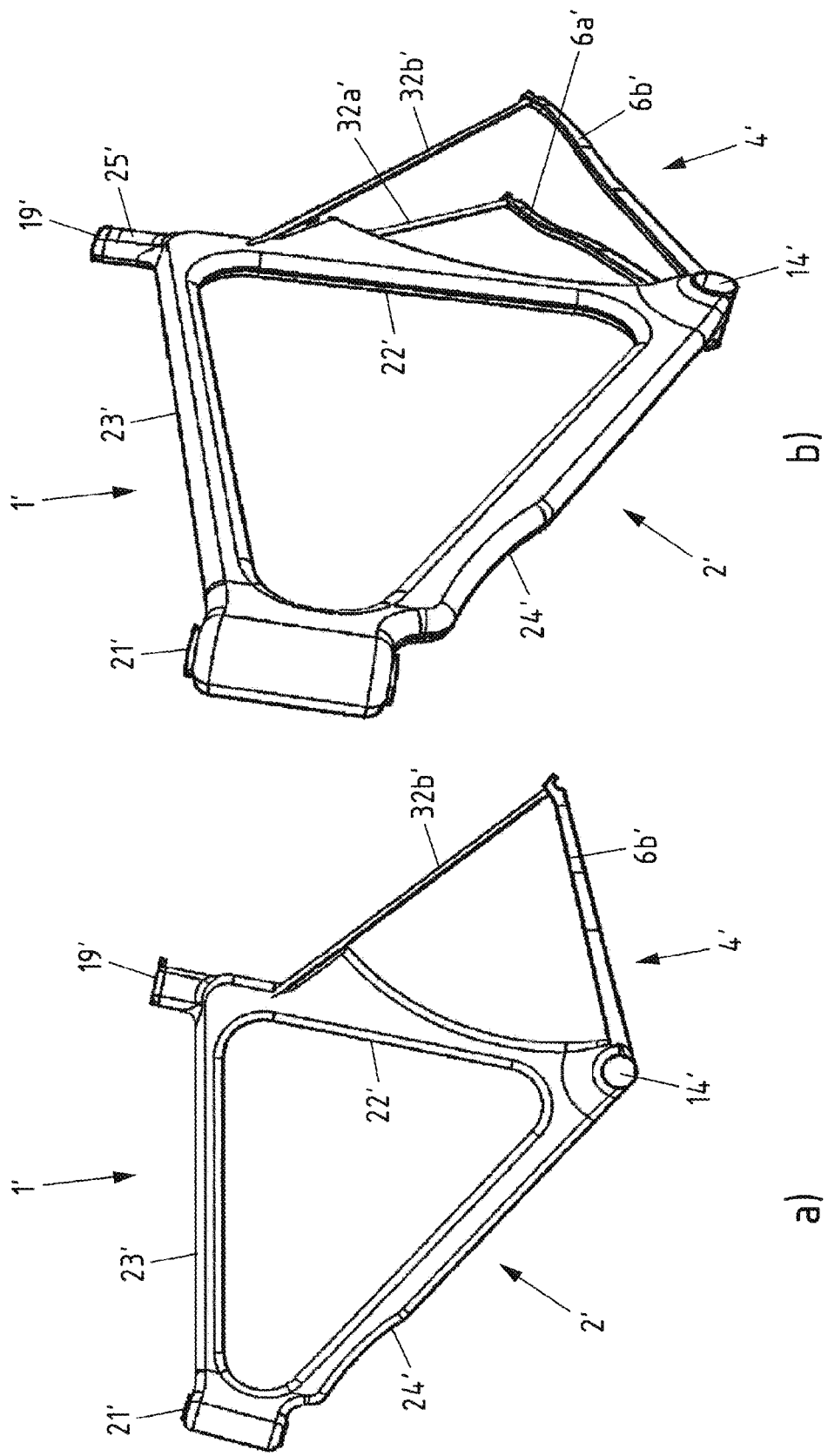
Figure 8:
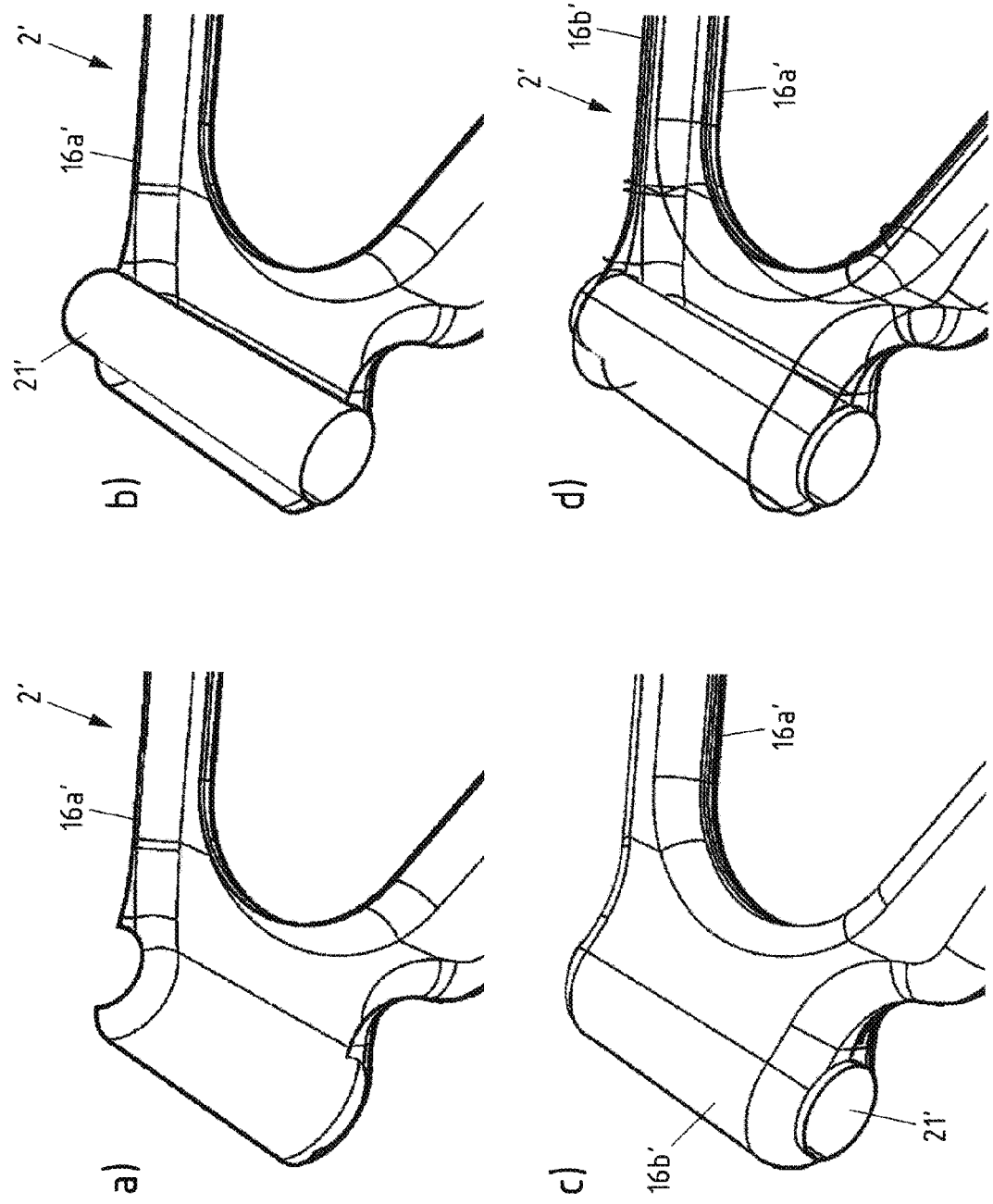
FIG. 8a is an enlarged view of the example main frame of FIGS. 7a and 7b, showing in particular an example first partial shell.
FIG. 8b is an enlarged view of the example main frame of FIGS. 7a and 7b, showing in particular an example head tube.
FIG. 8c is an enlarged view of the example main frame of FIGS. 7a and 7b, showing in particular an example second partial shell.
FIG. 8d is an enlarged semi-transparent view of the portion of the main frame shown in FIG. 8c.

FIG. 8a-d show enlarged views of the main frame 2' in the area of the head tube of the exemplary embodiment from FIG. 7. In contrast to the frame unit 1, rather than bearing bushings 18, the entire head tube 21' has been designed as an add-on part. This enables an extremely rigid head tube to be produced. However, the main frame 2' encloses the head tube 21'. FIG. 8a shows the first partial shell 16a', FIG. 8b shows in addition the head tube 21', FIG. 8c shows furthermore in addition the second partial shell 16b' in perspective view. FIG. 8d is a see-through view of FIG. 8c.

In other respects reference is made to the frame unit 1.

Figure 9:
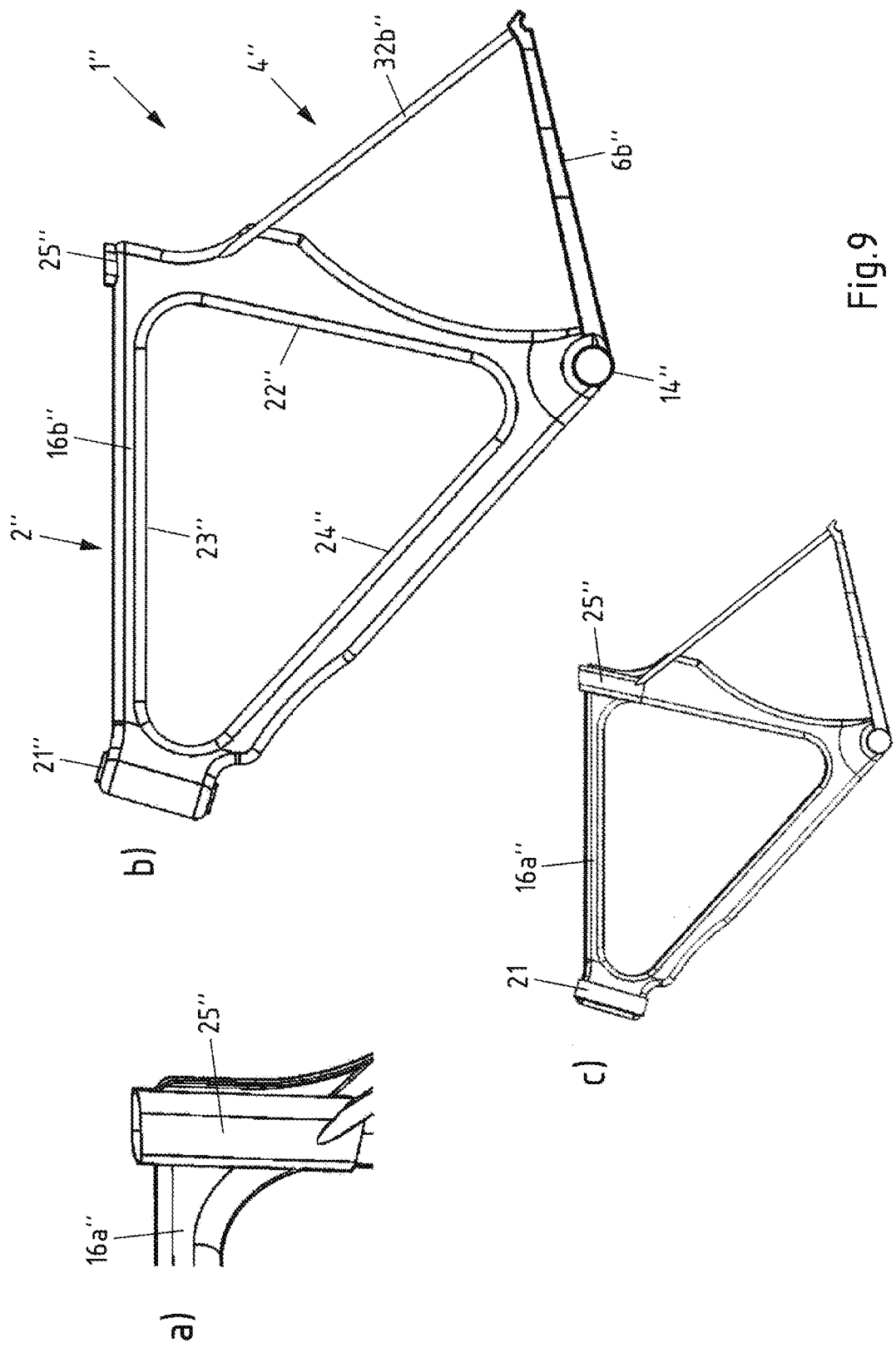
FIG. 9a is a perspective view of a first example partial shell, which includes an example seatpost, of still another example frame unit shown in FIG. 9c.
FIG. 9b is a side view of a second example partial shell of the example frame unit shown in FIG. 9c.
FIG. 9c is a side view of an example frame unit that includes the first partial shell of FIG. 9a and the second partial shell of FIG. 9b.

FIG. 9a-c show different views of a third exemplary embodiment of a frame unit 1" according to the invention. The frame unit 1" is similar to the frame unit 1'. Accordingly, one may refer to the description of the frame unit 1'. However, the seatpost 25" is not formed integrally with the main frame 2", but instead designed as a separate add-on part. This enables a rigid design of the seatpost. FIG. 9a, c shows the position of the seatpost 25" before the joining of the first partial shell 16a" to the second partial shell 16b".

What is claimed is:

1. A frame unit for a two-wheeled vehicle, the frame unit comprising:
   a main frame that comprises a first partial shell and a second partial shell joined to the first partial shell at least for a portion substantially along a primary loading direction, the main frame further including an integrally formed head tube;
   a rear section, separately formed from the main frame, the rear section comprising at least one closed profile portion; and
   a bottom bracket housing, separately formed from the main frame and the rear section;
   wherein the main frame, the rear section and the bottom bracket housing are joined together and are comprised of steel.

2. The frame unit of claim 1 wherein the joined first and second partial shells together form an upper tube, a lower tube, and a seat tube.

3. The frame unit of claim 1 wherein at least one of the first partial shell or the second partial shell is deep drawn.

4. The frame unit of claim 1 wherein a thermal weld joins the first partial shell and the second partial shell.

5. The frame unit of claim 1 comprising a cable conduit that extends at least for a portion in the main frame between the first partial shell and the second partial shell.

6. The frame unit of claim 1, further comprising a bearing bushing arranged at the head tube.

7. The frame unit of claim 1 wherein the first and second partial shells comprise at least one of a high-strength steel or a steel composite material.

8. The frame unit of claim 1, further comprising at least one of (a) a drive unit or a portion thereof and (b) an energy accumulator or a tank therefor disposed between the first partial shell and the second partial shell in the main frame.

9. The frame unit of claim 1 wherein each of the first and second partial shells forms a lateral half of the main frame, wherein the first and second partial shells have a C-shaped cross section.

10. The frame unit of claim 1 wherein the at least one closed profile portion comprises at least one of a chain stay and a seat stay.

11. The frame unit of claim 1, further comprising a seatpost integrally formed on the main frame and a seat clamp disposed on the seatpost.

12. A method for producing a frame unit comprising a main frame for a two-wheeled vehicle, the method comprising:
   providing a first partial shell and a second partial shell, wherein the first and second partial shells comprise steel, one of the first and second partial shells comprising an integrally formed head tube;
   joining the first partial shell and the second partial shell substantially along a primary loading direction to form the main frame;
   encasing a separately formed bottom bracket housing by the first and second partial shells; and
   joining a rear section to the main frame and the bottom bracket, the rear section comprising at least one closed profile portion including at least one of a chain stay and a seat stay.

\* \* \* \* \*